US00RE41903E

(19) United States
(12) Reissued Patent
Wenig et al.

(10) Patent Number: US RE41,903 E
(45) Date of Reissued Patent: Oct. 26, 2010

(54) SYSTEMS AND METHODS FOR RECORDING AND VISUALLY RECREATING SESSIONS IN A CLIENT-SERVER ENVIRONMENT

(75) Inventors: Robert Wenig, Mill Valley, CA (US); Igor Tsyganskiy, Palo Alto, CA (US); Kenneth Landry, Cary, NC (US)

(73) Assignee: SAP AG, Walldorf (DE)

(21) Appl. No.: 11/247,001

(22) Filed: Oct. 7, 2005

Related U.S. Patent Documents

Reissue of:
(64) Patent No.: 6,286,030
Issued: Sep. 4, 2001
Appl. No.: 09/113,376
Filed: Jul. 10, 1998

(51) Int. Cl.
*G06F 13/00* (2006.01)

(52) U.S. Cl. ..... 709/203
(58) Field of Classification Search ..... 709/203
See application file for complete search history.

(56) References Cited

U.S. PATENT DOCUMENTS

| | | | | |
|---|---|---|---|---|
| 5,463,547 | A | 10/1995 | Markowitz et al. | |
| 5,577,254 | A | 11/1996 | Gilbert | |
| 5,715,314 | A | 2/1998 | Payne | |
| 5,809,250 | A | 9/1998 | Kisor | |
| 5,825,880 | A | 10/1998 | Sudia | |
| 5,832,458 | A | 11/1998 | Jones | |
| 5,848,396 | A | 12/1998 | Gerace | |
| 5,867,578 | A | 2/1999 | Brickell | |
| 5,903,652 | A | 5/1999 | Mital | |
| 5,909,492 | A | 6/1999 | Payne | |
| 5,951,643 | A | 9/1999 | Shelton et al. | 709/227 |
| 6,151,601 | A | 11/2000 | Papierniak et al. | 707/10 |
| 6,286,098 | B1 | 9/2001 | Wenig | |
| 6,714,931 | B1 | 3/2004 | Papierniak et al. | 707/10 |
| 7,272,639 | B1 | 9/2007 | Levergood | |

FOREIGN PATENT DOCUMENTS

| | | | |
|---|---|---|---|
| EP | 032683 A1 | | 1/1989 |
| EP | 1097428 B1 | | 6/2002 |
| GB | 0 326 283 | * | 8/1989 |
| WO | 0843449 A2 | | 5/1998 |
| WO | 9825372 A2 | | 6/1998 |
| WO | 9826571 A2 | | 6/1998 |
| WO | WO 98/26571 | * | 6/1998 |
| WO | 9836520 A1 | | 8/1998 |
| WO | 0013371 A1 | | 3/2000 |

OTHER PUBLICATIONS

Smith, John et al., "Automated Protocol Analysis", Human–Computer Interactions, 1993, vol. 8, pp. 101–145.

Bishop, Matt et al., "A Model of Security Monitoring", Department of Mathematics and Computer Science, Dartmouth College, pp. 46–52, undated.

Holloway et al., "Cryptographic Initialization Test", IBM Technical Disclosure Bulletin, pp. 195–198, Feb. 1991.

* cited by examiner

*Primary Examiner*—Robert B Harrell
(74) *Attorney, Agent, or Firm*—Park, Vaughan, Fleming & Dowler LLP

(57) ABSTRACT

A system and method for auditing network applications captures transmissions during a user session between a client and a server. An auditor capture filter captures and stores each request from the client and each response by the server to each request in an auditor storage. An auditor analyzer may use the captured requests and the captured responses to visually recreate the user session to thereby analyze what transpired during the user session.

130 Claims, 13 Drawing Sheets

400

440

360

SYSTEMS AND METHODS FOR RECORDING AND VISUALLY RECREATING SESSIONS IN A CLIENT-SERVER ENVIRONMENT

Matter enclosed in heavy brackets [ ] appears in the original patent but forms no part of this reissue specification; matter printed in italics indicates the additions made by reissue.

+i RELATED APPLICATION

*This application is related to issued U.S. Pat. No. 6,286,098, entitled "System and Method for Encrypting Audit Information in Network Applications," by inventors Robert Wenig and Igor Tsyganskiy. This application is also related to issued European Patent 1 097 428 B1, entitled "System and Method for Auditing Network Applications," by inventors Robert Wenig, Igor Tsyganskiy, and Kenneth Landry, filed on 10 Jul. 1999.*

BACKGROUND OF THE INVENTION

1. Field of the Invention

The present invention relates to a system and method for auditing network applications. More particularly, the present invention relates to a system and method for visually recreating a user session to analyze various aspects of the network application.

2. Discussion of the Related Art

In a network application, also referred to as a client/server application, a client requests information from a server. In response to each request, the server provides information to the client. A typical server may be responding to several hundred clients at one time, while the client may access several servers intermittently and over a very short period of time. As a result of the very dynamic nature of such applications, problems associated with the application are difficult to isolate, repeat, and/or diagnose. Furthermore, such problems are difficult to attribute to either the server or the client.

Another problem associated with network applications, particularly those dealing in electronic commerce ("e-commerce"), is that the precise behavior of the purchaser during the transaction is difficult to ascertain and even more difficult to evaluate or understand. For example, website developers may wish to understand how a particular buyer using an e-commerce application navigates through the website to purchase an item. Given the nature of conventional network applications, such understanding is difficult to obtain.

Still other problems exists with network applications, some of which are discussed in further detail below. A need exists for a system and method for auditing network applications that solves the problems described herein.

SUMMARY OF THE INVENTION

Accordingly, the present invention is directed to a system and method for auditing network applications. In particular, the present invention captures requests and responses sent between a client and a server during a particular user session of a network application. The present invention stores the requests and responses in an auditor storage. Subsequently, the present invention retrieves the requests and responses from the auditor storage to visually recreate the user session.

One of the features of the present invention is that an analyst is able to retrieve a particular user session from the auditor storage and step through a particular user session thereby viewing the user session as the client viewed the user session. This enables the analyst to understand the sequence of events that occurred during a particular user session exactly as they occurred.

Another feature of the present invention is that the analyst can determine the exact sequence of events that occurred prior to an error occurring in the network application. In addition, the present invention stores information describing the client/server environment during the user session so that the analyst may be able to attribute certain errors to loading or traffic on the server or the communication link.

Another feature of the present invention is that the analyst can view data associated with multiple user sessions to analyze how different clients navigated through a particular website. Such analysis is useful to determine how particular websites might be improved to achieve a particular result.

Another feature of the present invention is that OLAP analysis can be used, for example, to provide better response times to clients who routinely purchase by shifting them to a faster application server. Furthermore, clients who routinely purchase could also be offered a direct path to a particular location in the website thereby avoiding the path through the website provided to other clients. In addition, the analyst can ascertain the value of advertising on the website by viewing the number of purchases before and after such advertising.

Additional features and advantages of the present invention will be set forth in the description which follows, and in part will be apparent from the description, or may be learned by practice of the invention. The objectives and other advantages of the invention will be realized and attained by the process particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
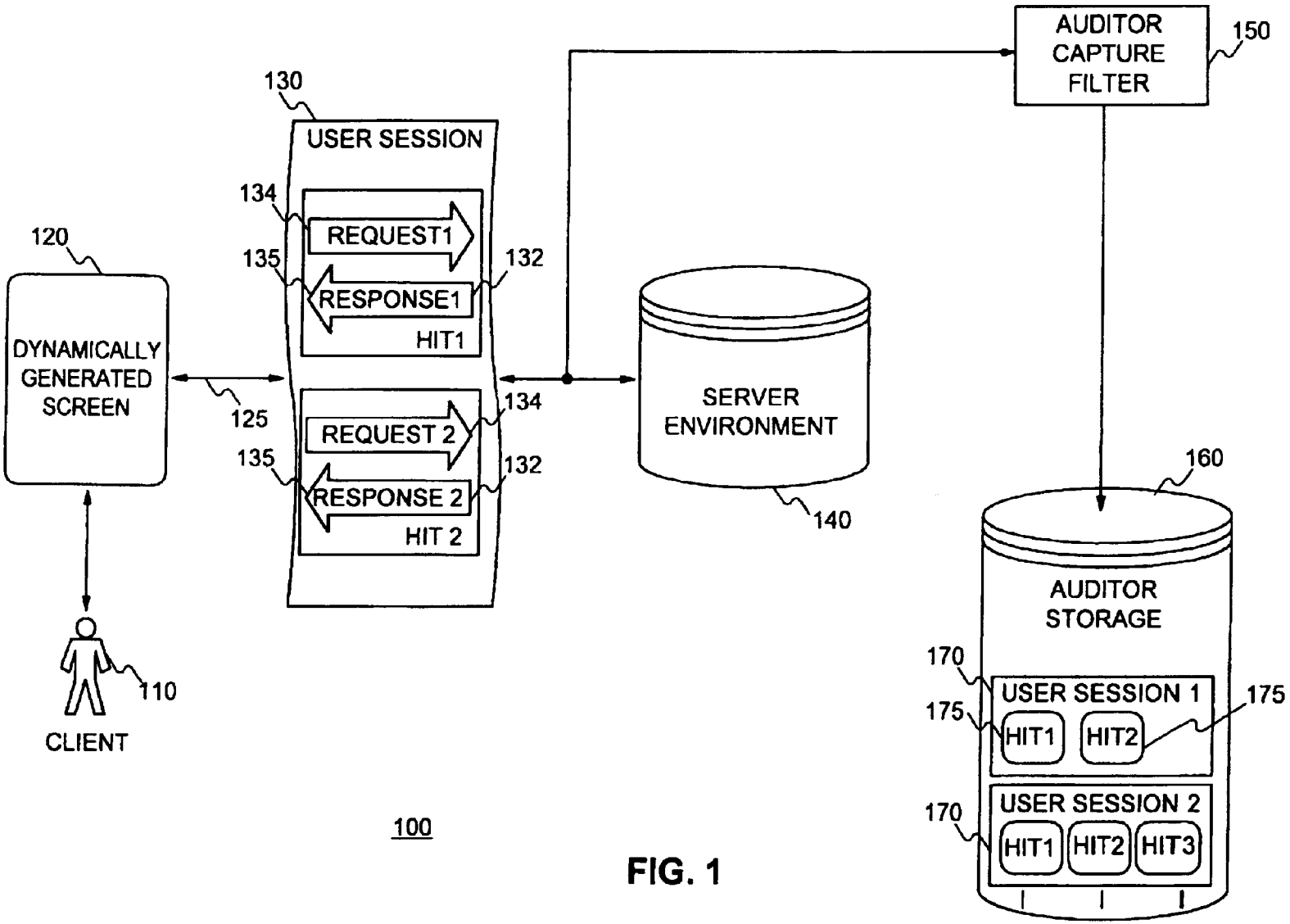
FIG. 1 illustrates an embodiment of the present invention capturing session data in a client/server environment.

In a client/server environment 100, such as that illustrated in FIG. 1, a client 110 communicates with a server environment 140 through a communication link 125. As would be understood, server environment 140 may comprise a single network server or several servers acting in conjunction with one another.

A particular set of related communications between client 110 and server environment 140 is referred to as a user session 130. User session 130 includes a series of requests 134 made by client 110 to server environment 140, and a series of responses 132 from server environment 140 to client 110 in response to requests 134. A particular request 134 and its associated response 132 is referred to herein as a hit 135 or alternatively as a request/response pair. During user session 130, client 110 may access server environment 140 in any of several manners, as is known in the art.

Client 110 accesses server environment 140 through a dynamically generated screen 120 which displays information to client 110 from server environment 140 for a particular network application. Based on requests 134 and responses 132, server environment 140 provides information to update dynamically generated screen 120. According to one embodiment of the present invention, dynamically generated screen 120 is generated by a work station (not shown) of client 110 based on information included in response 132 from server environment 140. In one embodiment of the present invention, dynamically generated screen 120 is generated by the work station based on a response 132 that includes a markup language such as HTML, XML, SGML, etc., used in various client/server environments 100. In an alternate embodiment of the present invention, dynamically generated screen 120 is generated by a work station of client 110 based on a response 132 that includes information compatible with formats utilized in a dedicated on-line environment such as a SAP R/3 environment.

The following discussion is based on client/server environment 100 operating in an Internet or Web-based environment. However, it should be understood that the present invention also contemplates a system where client 110 is hard-wired directly to server environment 140, such as in the SAP R/3 environment. It will be apparent to one skilled in the art how the following discussion applies to such hard-wired or "dedicated" systems.

According to the present invention, an auditor capture filter 150 monitors communication link 125 to capture communications (i.e., requests 134 and responses 132) between client 110 and server environment 140. In particular, auditor capture filter 150 captures request 134 from client 110 to server environment 140 and captures response 132 from server environment 140 to client 110. In one embodiment of the present invention, auditor capture filter 150 captures request 134 from communication link 125 after server environment 140 has received request 134 but before server environment 140 has processed request 134. In this embodiment of the present invention, auditor capture filter 150 captures response 132 after server environment 140 has processed request 134 and determined response 132 but prior to server environment 140 sending response 132. It should be understood that the capturing function of a preferred auditor capture filter 150 does not interfere with or interrupt communication between client 100 and server environment 140.

In the embodiment of the present invention just described, server environment 140 would include the necessary modifications to provide auditor capture filter 150 with access to requests 134 and responses 132. In other words, server environment 140 would provide auditor capture filter 150 with the necessary hooks to the session data as would be apparent. In this embodiment, auditor capture filter 150 captures requests 134 and responses 132 with the cooperation and possibly the active participation of server environment 140.

In an alternate embodiment of the present invention, auditor capture filter 150 would not require the modifications to server environment 140 discussed above. In this alternate embodiment of the present invention, auditor capture filter 150 would capture requests 134 and responses 132 directly from communication link 125 and server environment 140 would function without regard to the presence of auditor capture filter 150.

Auditor capture filter 150 stores captured request 134 and captured response 132 in an auditor storage 160. In a preferred embodiment of the present invention, captured request 134 and captured response 132 are stored as a hit 135. Auditor storage 160 includes a storage device such as a disk drive, a RAM, a database or other such memory device as would be apparent. In some preferred embodiments of the present invention, auditor storage 160 stores all hits 135 in a particular user session 130 as stored hits 175 in a stored user session 170. In other words, in these embodiments of the present invention, the series of captured requests 134 and captured responses 132 that comprise a particular user session 130 are stored collectively as stored user session 170.

In one embodiment of the present invention, user session 130 is conducted over an Internet. As such, after each transmission, (i.e., after each request 134 from client 110 to server environment 140 and after each response 132 from server environment 140 to client 10) client 110 and server environment 140 are not in active communication (i.e., they are effectively disconnected). In such an application, a unique session identification (also referred herein as a state identification) is used to identify a particular client 110 each time the particular client 110 accesses server environment 140. The session identification is sent with each request 134 to uniquely determine the user context. Using the session identification to attribute each request 134 to a particular client 110, server environment 140 is able to handle client 110 over the Internet as if client 110 was continuously connected to server environment 140.

In a second embodiment of the present invention, client 10 and server environment 140 are continuously connected via dedicated communication link 125. In this embodiment of the present invention, a session identification is not necessary for each request 134; rather, the session identification is implicit in each transmission between client 110 and server environment 140 as a result of the dedicated communication link 125.

As discussed above, a series of requests 134 and responses 132 between client 110 and server environment 140 that comprise user session 130 are stored in auditor storage 160 as stored hits 175 in stored user session 170. As discussed in reference to FIG. 2, an analyzer 220 enables an analyst 210 to analyze user session 170. For example, analyst 210 may evaluate user session 170 to determine how client 10 moves through a particular network application to achieve a particular result. Such evaluation is useful, for example, in commercial or e-commerce Internet applications. In these applications, application developers are interested in understanding how a client 110 navigates through a particular application to arrive at a particular result, such as a purchase. As can be appreciated, the present invention permits analyst 210 to evaluate the particular application for different clients 110, at different times, etc.

In another example, analyst 210 may evaluate user session 170 to isolate errors that occurred during user session 130. In this example, analyst 210 can recreate the entire user session 130 in an effort to identify and isolate a problem with a particular network application.

Figure 2:
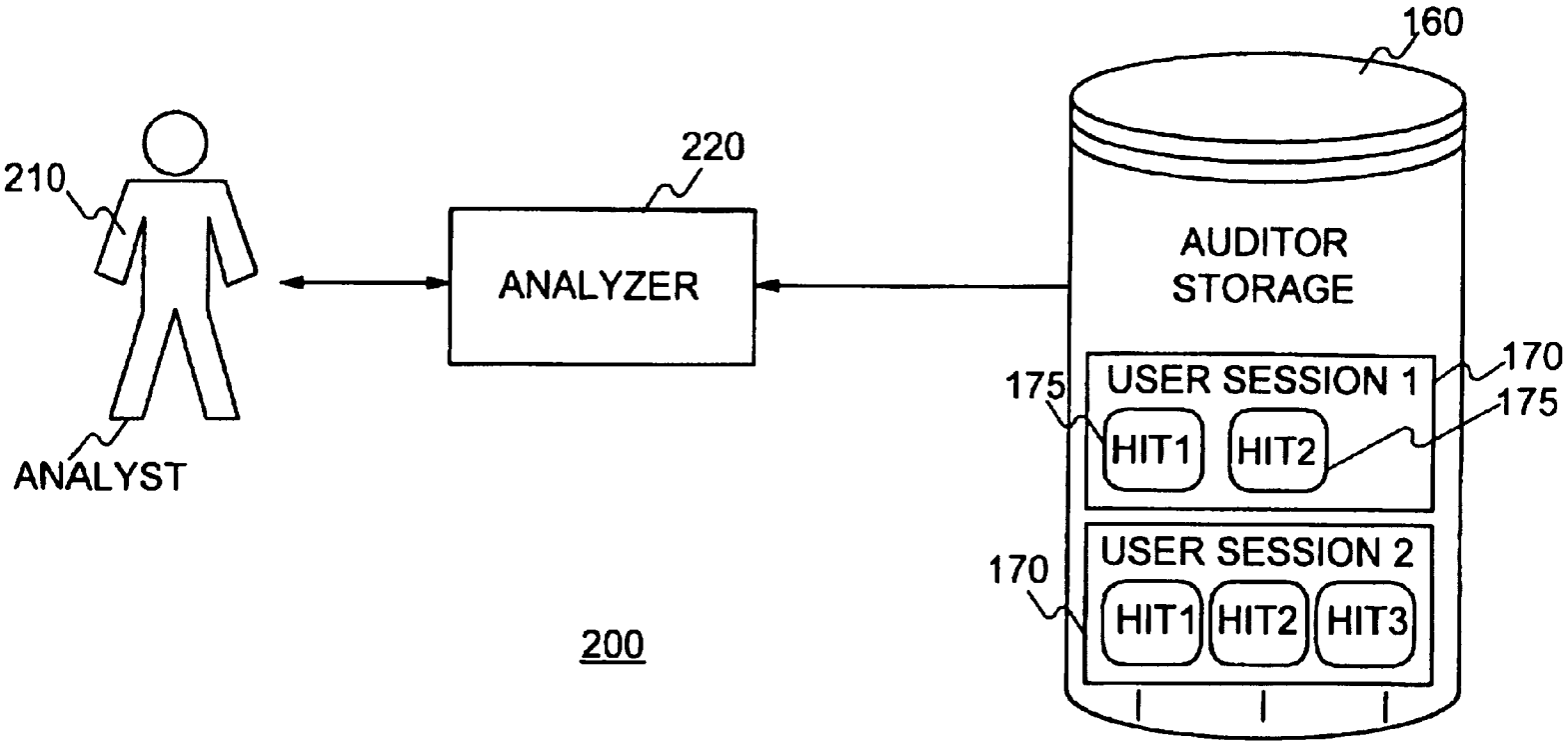
FIG. 2 illustrates an embodiment of the present invention analyzing captured session data in an auditing environment.

As shown at FIG. 2, analyst 210 uses analyzer 220 to access auditor storage 160. In particular, analyst 210 is able to access a particular user session 170 and visually recreate it. In other words, analyst 210 is able to step through the particular user session 170 and individually evaluate each request 134 and each response 132 as it occurred during user session 170. In a preferred embodiment of the present invention, analyzer 220 visually recreates user session 170 by generating the various screens 120 that were presented to client 110 by server environment 140 during user session 130. In this manner, analyst 210 is able to view the identical screens 120 that client 110 viewed during user session 130. Analyst 210 is also able to evaluate any request made by client 110 and evaluate any subsequent response 132 of server environment 140. As would be apparent, analyst 210 may evaluate user session 130 off-line, that is, after user session 170 is complete, or in near real-time, that is, while user session 170 is occurring. In this latter embodiment, analyzer 220 may retrieve hits 175 from auditor storage 160 or directly from auditor capture filter 150 (thereby by passing auditor storage 160).

Figure 3:
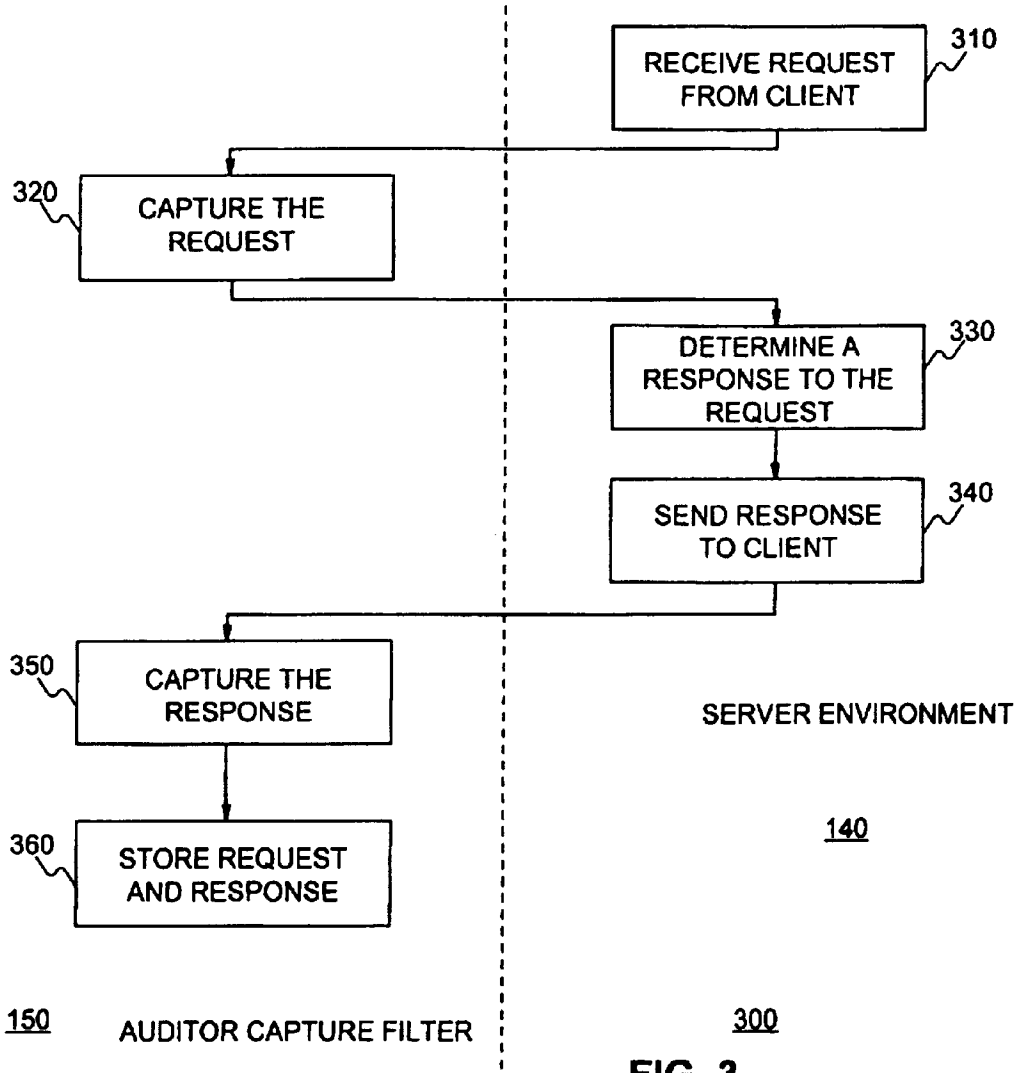
FIG. 3 is a flowchart that illustrates the operation of one embodiment of the present invention as it captures session data.

Having thus described the components of the present invention, the operation of the present invention is now discussed. FIG. 3 is a flowchart that illustrates an operation 300 of auditor capture filter 150 as it captures requests 134 and responses 132 during user session 130 according to one embodiment of the present invention. In a step 310, server environment 140 receives a request 134 from client 110. In a step 320, auditor capture filter 150 captures request 134. In one embodiment of the present invention, auditor capture filter 150 captures request 134 at server environment 140. Specifically, in this embodiment, auditor capture filter 150 captures request 134 from server environment 140 after server environment 140 receives request 134 but prior to server environment 140 processing request 134. In an alternate embodiment of the present invention, server environment 140 may pass request 134 to auditor capture filter 150 as would be apparent. Of course, other mechanisms exist that permit auditor capture filter 150 to gain access to request 134 as would be apparent. In any case, the capture of request 134 does not interfere with or interrupt communication between client 110 and server environment 140.

In an alternate embodiment of the present invention, auditor capture filter 150 captures request 134 directly from communication fink 125 without cooperation from or participation with server environment 140.

In a preferred embodiment of the present invention, capturing request 134 includes capturing or determining particular environmental data (not shown) associated with client 110 and server environment 140 at or about the time request 134 was sent or captured. This environmental data includes parameters such as loading, traffic volume, status, or other such information available on communication link 125 and well known in client/server environment 100. As will be discussed below, the environmental data permits analyzer 220 to evaluate the effect of client/server environment 100 on a particular user session 170.

In a step 330, server environment 140 determines a response 132 to request 134 from client 110. In a step 340, server environment 140 sends response 132 to client 110. In a step 350, according to one embodiment of the present invention, auditor capture filter 150 captures response 132 from server environment 140 to client 110. In an alternate embodiment, server environment 140 may pass response 132 to auditor capture filter 150 as would be apparent. In yet another alternate embodiment of the present invention, auditor capture filter 150 captures response 132 directly from communication link 125. Furthermore, as discussed above with respect to capturing request 134, in a preferred embodiment of the present invention, capturing response 132 includes capturing environmental data associated with response 132.

Finally, in a step 360, auditor capture filter 150 stores captured request 134 and captured response 132 as a hit 175 in auditor storage 160. In particular, each hit 175 (or alternately, each request/response pair) is stored in auditor storage 160 together with other hits associated with a particular user session 170.

In an alternate embodiment of the present invention, auditor capture filter 150 stores captured request 134 in auditor storage 160 as soon as it is captured rather than waiting for an associated captured response 132. In other words, captured request 134 and captured response 132 are stored as they are captured.

According to one embodiment of the present invention, auditor capture filter 150 captures or receives requests 134 and/or responses 132 from server environment 140. In fact, in actual implementation, auditor capture filter 150 may reside on and operate in conjunction with server environment 140. With this implementation and according to the present invention, software, hardware, or a combination of software and hardware associated with auditor capture filter 150 is not required at client 110 nor does client 110 require any modifications to the hardware or software residing therein.

In an alternate embodiment of the present invention, auditor capture filter 150 captures requests 134 and responses 132 directly from communication link. In this embodiment of the present invention, software, hardware, or a combination of software and hardware associated with auditor capture filter 150 is not required at either client 110 or server environment 140.

Figure 4:
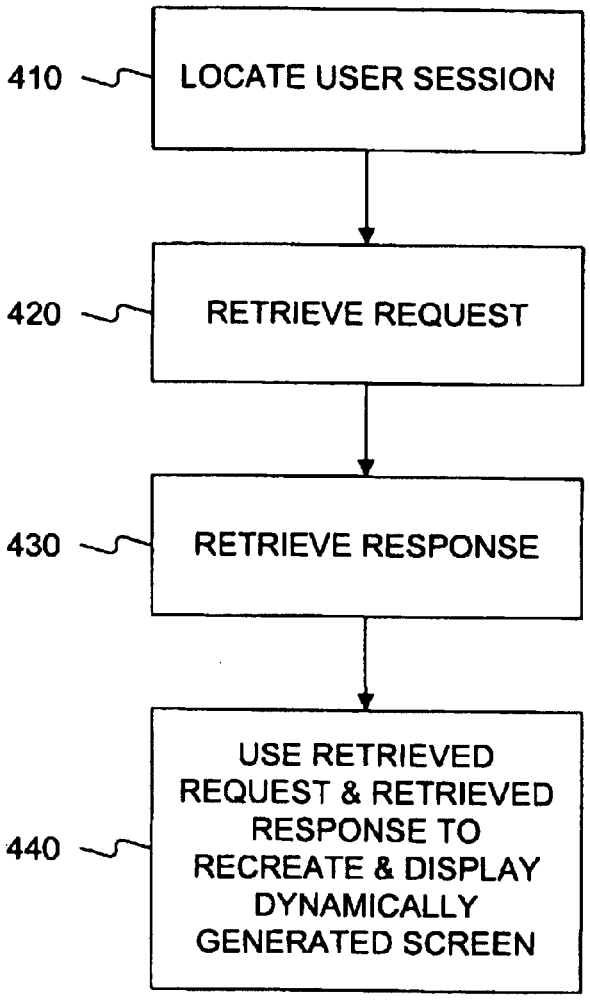
FIG. 4 is a flowchart that illustrates the operation of one embodiment of the present invention as it visually recreates a user session.

FIG. 4 is a flowchart that illustrates the operation 400 of analyzer 220 as it facilities the analysis of a user session 170 according to one embodiment of the present invention. In a step 410, analyzer 220 locates a particular user session 170 in auditor storage 160. In an alternate embodiment that bypasses auditor storage 160, analyzer 220 specifies to auditor capture filter 150 a particular user session 170 that analyzer 220 wishes to analyze.

User session 170 may be located by any number of mechanisms as would be apparent. Such mechanisms may permit analyzer to access auditor storage 160 according to the date and/or session number which correspond to a particular user session 170 sought. However, such date and session number may not always be known. Hence, analyzer 220 may include other mechanisms for locating user session 170 such as searching auditor storage 160 using key words, identifiers, etc., or any other manner of searching auditor storage 160 as would be apparent to one skilled in the art.

After a particular user session 170 has been located, in a step 420, analyzer 220 retrieves request 134 from auditor storage 160. Likewise, in a step 430, analyzer 220 retrieves response 132 corresponding to request 134 from auditor storage 160. As discussed above, in an alternate embodiment of the present invention, analyzer 220 may retrieve request 134 and response 132 directly from auditor capture filter 150.

In a preferred embodiment of the present invention, when analyzer 220 retrieves request 134 and response 132, analyzer 220 also retrieves associated environmental data that may have been stored with each request 134 and response 132 as discussed above.

In a step 440, analyzer 220 uses the retrieved request and the retrieved response, and in the preferred embodiment, the retrieved environmental data associated with each, to recreate and display the dynamically generated screen 120. In this manner, analyzer 220 is able to present to analyst 210 a dynamically generated screen 120 that is the same as that viewed by client 110 during user session 130.

Figure 5:
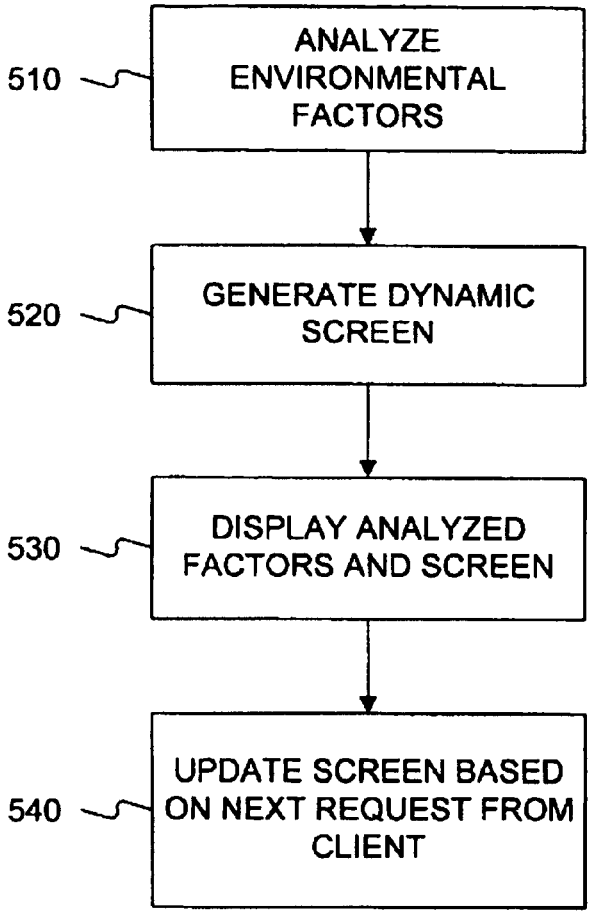
FIG. 5 is a flowchart that illustrates the operation of a preferred embodiment of the present invention as it performs the step of recreating and visually displaying the dynamically generated screen.

FIG. 5 illustrates the operation of a preferred embodiment of step 440 in further detail. In a step 510, analyzer 220 analyzes the environmental data and other factors associated with retrieved request 134 and retrieved response 132. In a step 520, analyzer 220 generates a screen based on retrieved request 134 and retrieved response 132 thereby recreating dynamically generated screen 120. In a step 530, analyzer 220 displays the analyzed environmental data and the generated screen to analyst 210. This permits analyst 210 to view the recreated screen in the context of the environmental factors that may have effected the particular user session 170. In a preferred embodiment of the present invention, in a step 540, the recreated screen is updated to reflect data entered by user 110. This data is obtained from a subsequent request 132 from client 110 to server environment 140 in the particular user session 170.

Figure 6:
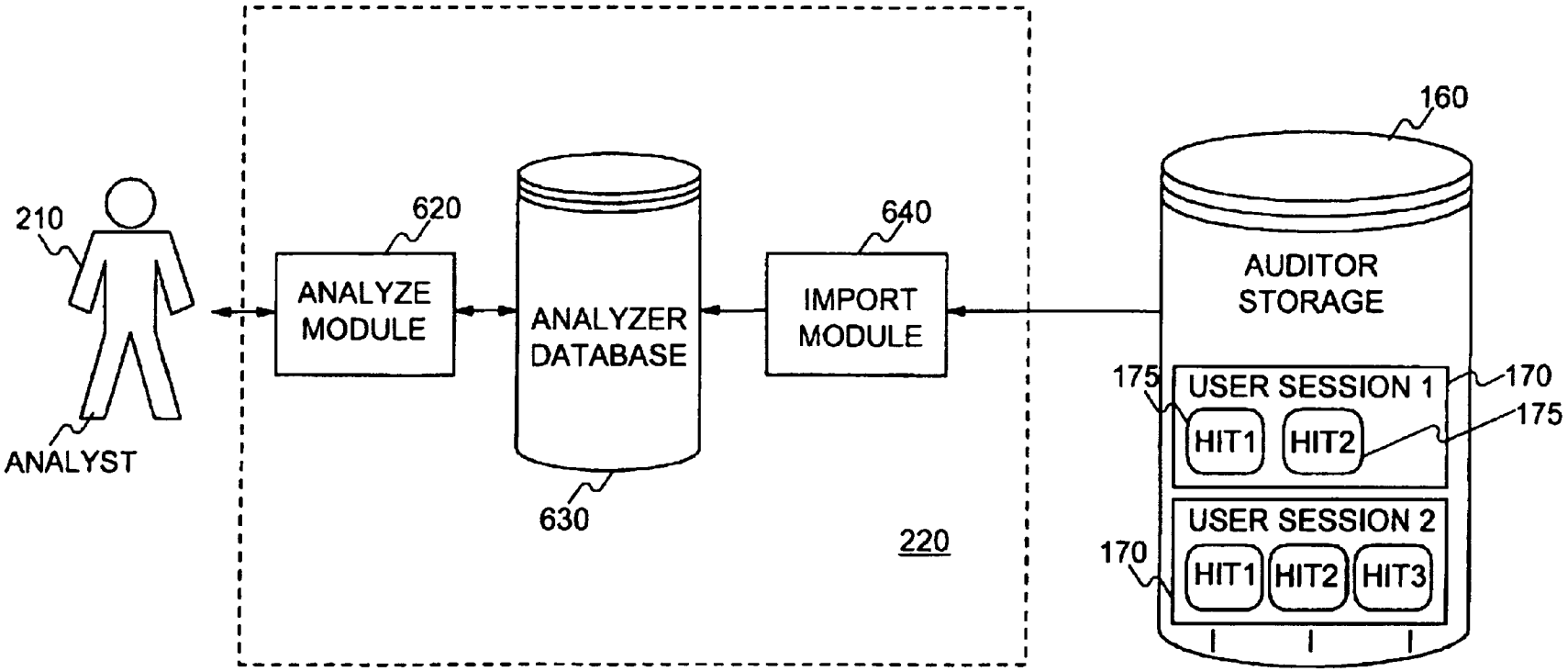
FIG. 6 illustrates an analyzer according to a preferred embodiment of the present invention in further detail.

Analyzer 220 is now discussed in further detail in reference to FIG. 6. Analyzer 220 includes a analyze module 620, an analyzer database 630, and an import module 640. Import module 640 extracts meaningful information out of the raw data of user session 170 stored in auditor storage 160 for use by analyst 210. In a preferred embodiment of the present invention, import module 640 extracts information from hits 175 in user session 170 from auditor storage 160 and stores it in analyzer database 630 in a particular format unique to analyzer database 630. For example, for one application, import module 640 extracts information from hits 175 captured in an Internet environment, while for another application, import module 640 extracts information from hits 175 captured in an SAP R/3 environment. By doing so, import module 640 can extract session data associated with a variety of clients 110 and server environments 140 and combine it into one centralized, uniform database, such as analyzer database 630. Thus, subsequent analysis tools (such as analyze module 620) can analyze session data regardless of the format of captured hits 175. Furthermore, using the common format of analyzer database 630, the subsequent analysis tools can meaningfully compare session data obtained from different clients 110, server environments 140, applications, etc.

In a preferred embodiment of the present invention, data stored in analyzer database 630 includes pertinent data from request 132 and response 134, and the associated environmental data. This data includes information associated with and derived from client 110 and server environment 140 as well as the communication protocols used, and other relevant information that would be apparent to those familiar with various network protocols.

Figure 9:
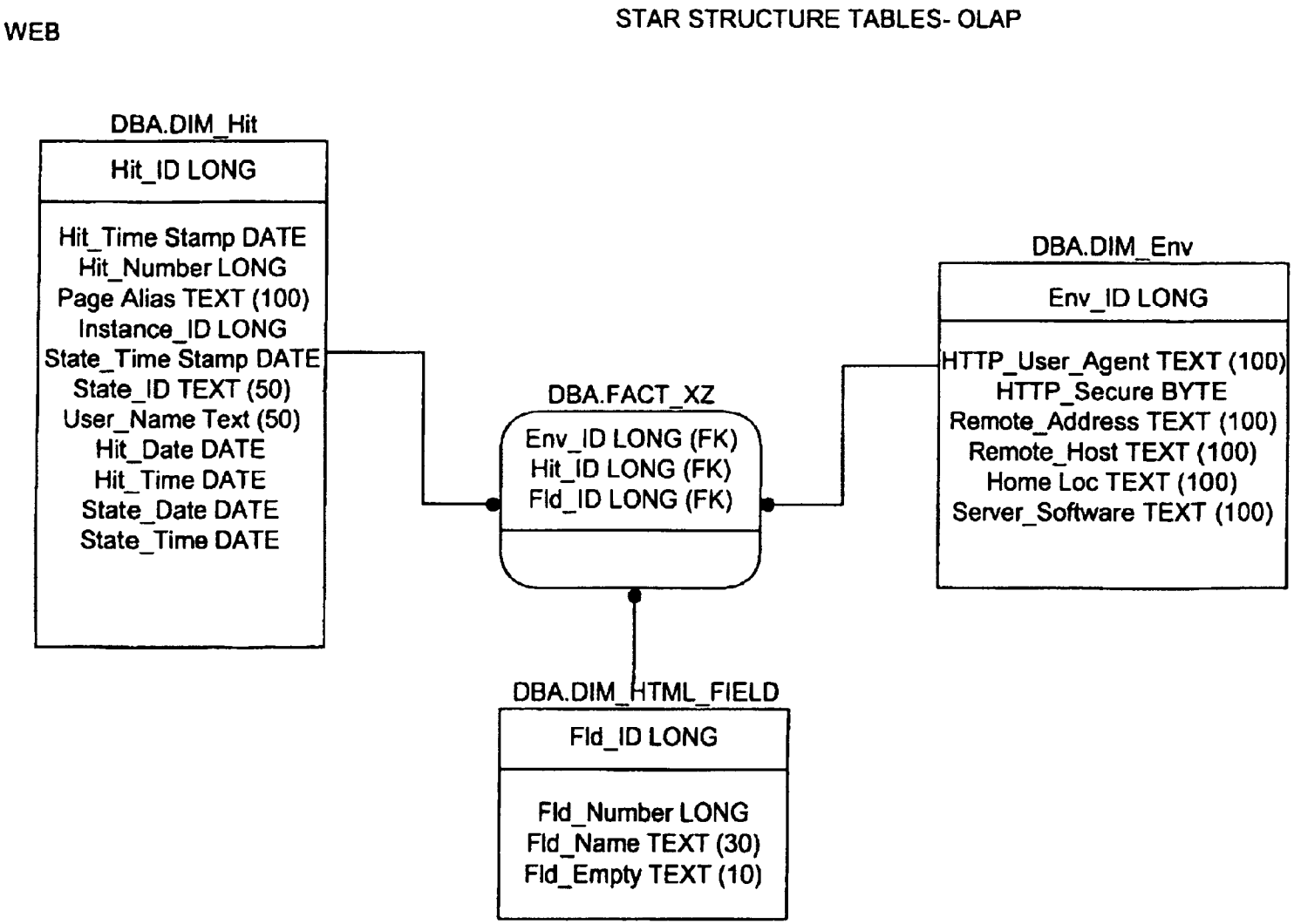
FIG. 9 illustrates a star structure for storing OLAP data for an internet based environment according to one embodiment of the present invention.
Figure 10:
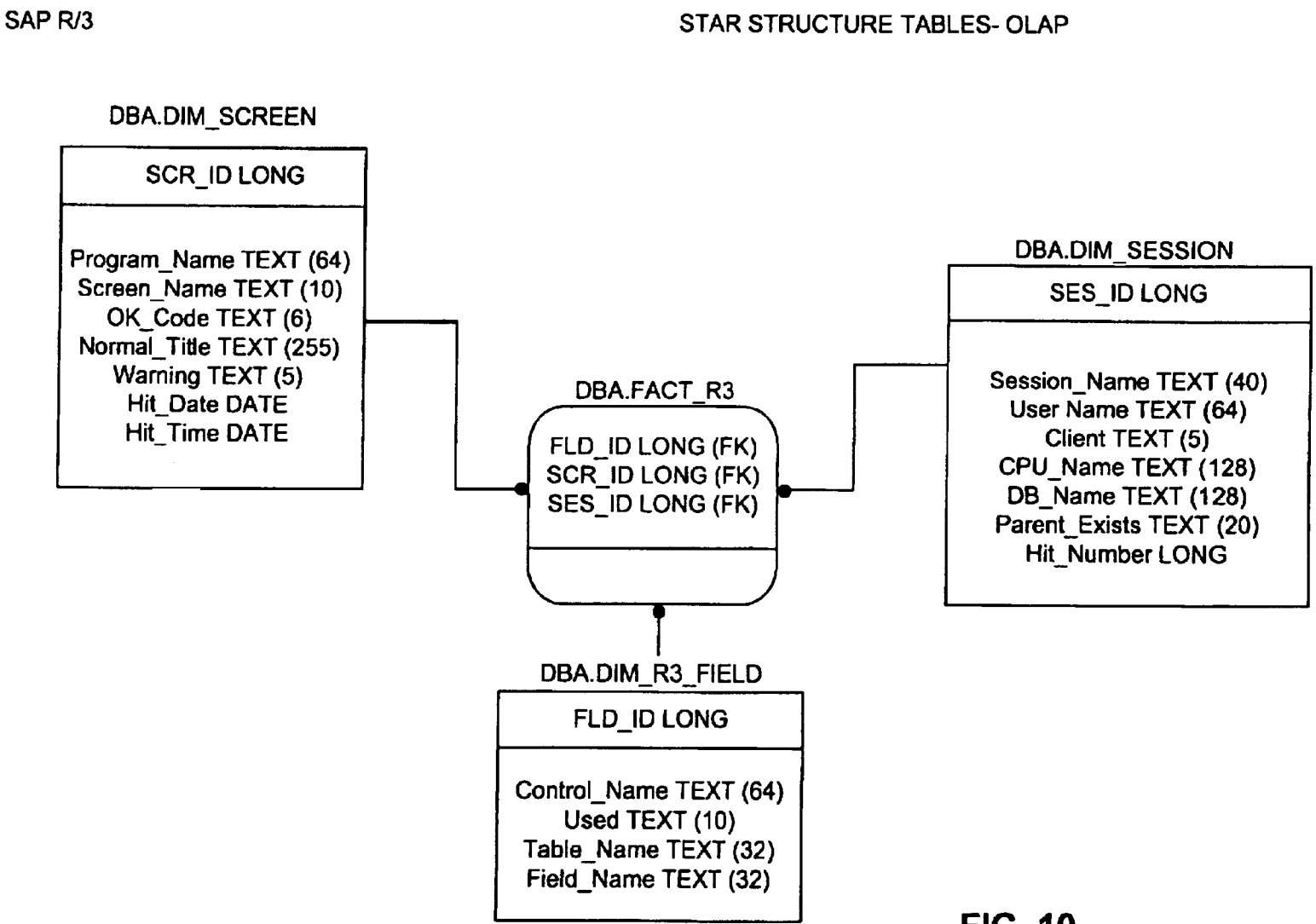
FIG. 10 illustrates a star structure for storing OLAP data for an SAP R/3 environment according to one embodiment of the present invention.

In a preferred embodiment of the present invention, analyzer database 630 includes two sets of tables for each application in client/server environment 100. The first tables are referred to as OLAP ("On-line Analysis Program") analysis tables. The OLAP analysis tables are designed and optimized for preliminary OLAP analysis. In a preferred embodiment of the present invention, the OLAP analysis tables have a star-scheme structure and are fully indexed. FIG. 9 illustrates a preferred embodiment for a star structure for hits captured in an Internet or Web-based environment, while FIG. 10 illustrates a preferred embodiment for a star structure for hits captured in an SAP R/3 environment.

Figure 11:
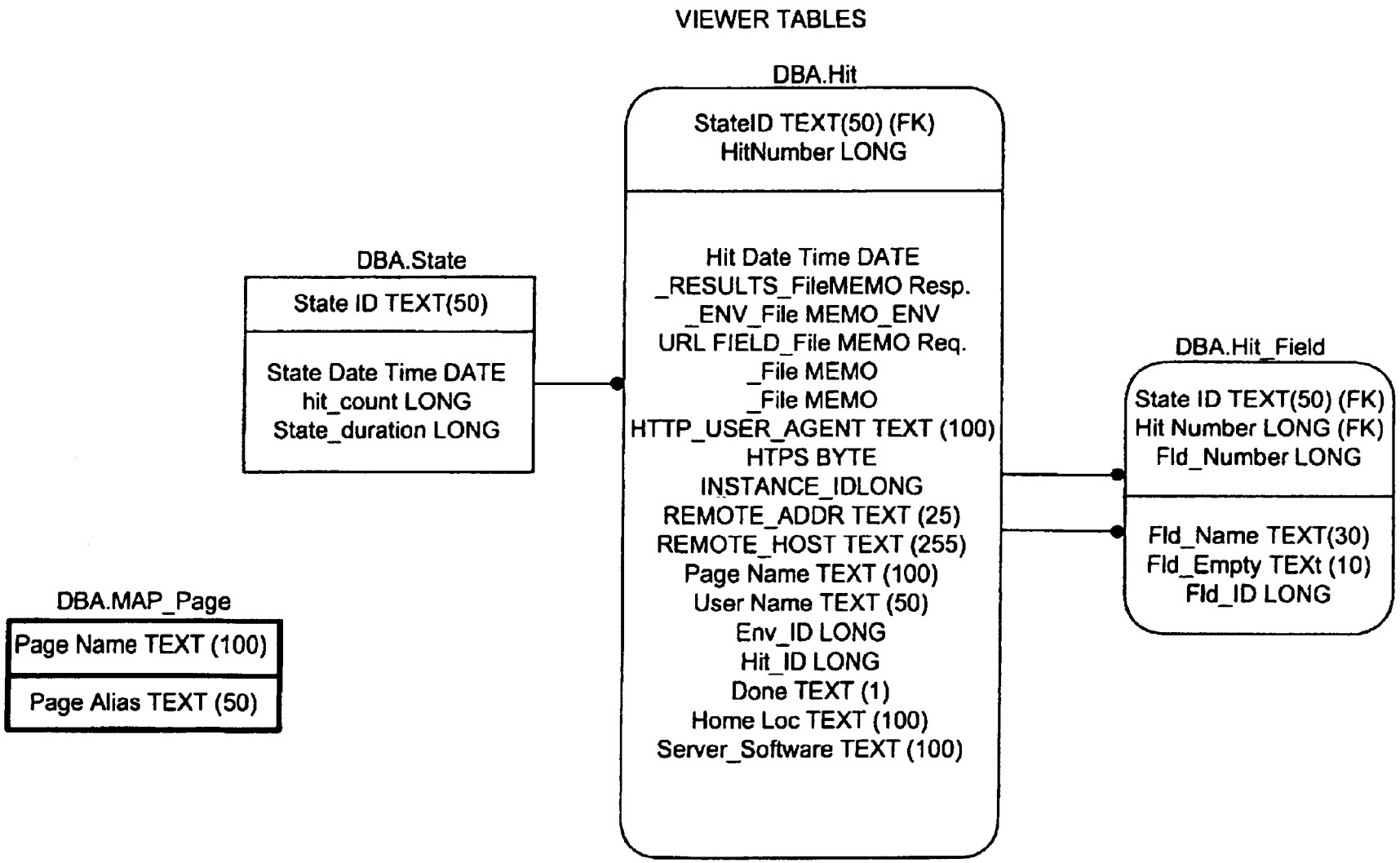
FIG. 11 illustrates a viewer table data structure for an internet based environment according to one embodiment of the present invention.
Figure 12:
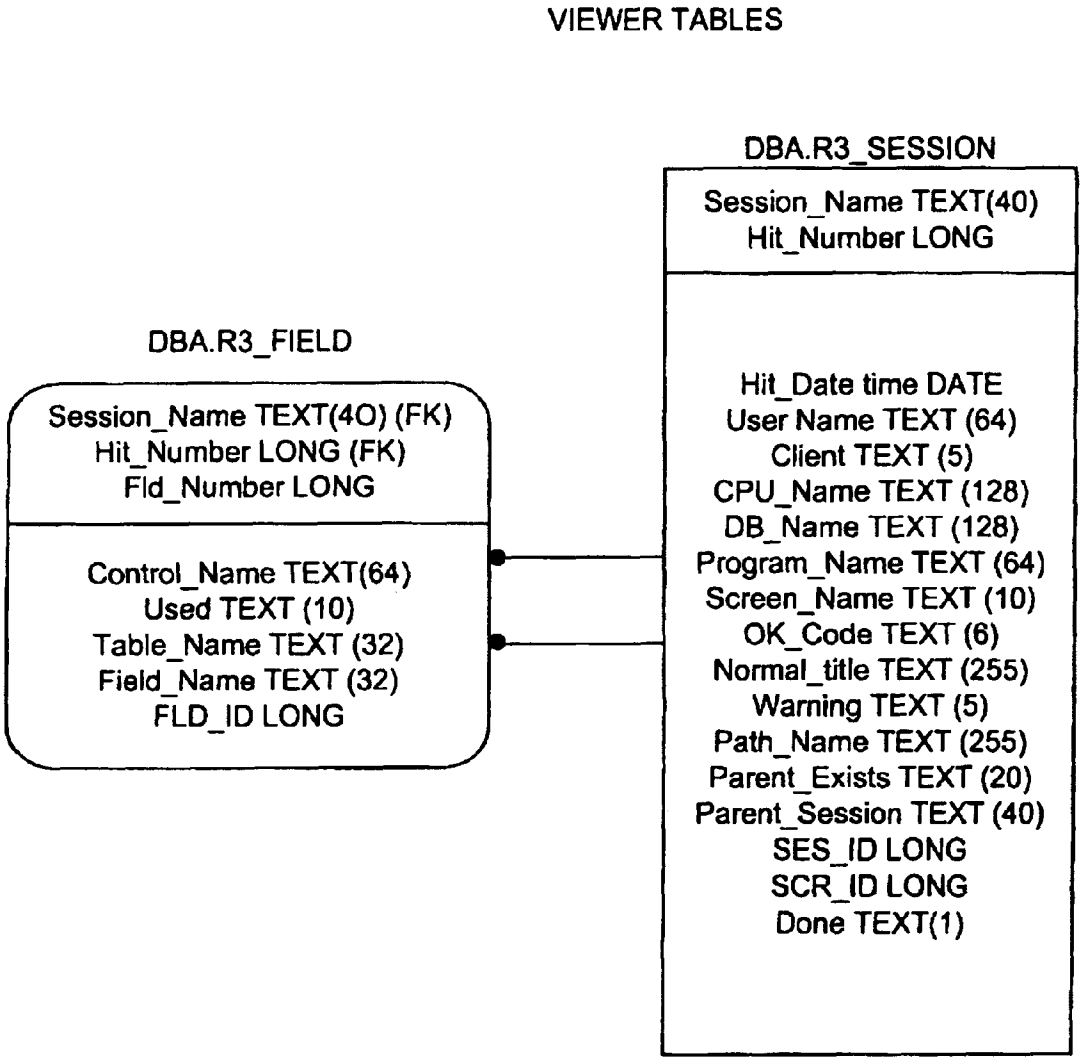
FIG. 12 illustrates a viewer table data structure for an SAP R/3 environment according to one embodiment of the present invention.

The second tables in database 1130 are referred to as session viewer/analysis tables. Session viewer/analysis tables are designed and optimized for visually recreating user session 130 and for doing session-specific analysis. Session viewer analysis tables include all of the hit information as well as information about the creation of available sessions and information extracted from the session identification. FIG. 11 illustrates a preferred embodiment for a viewer table for hits captured in the Internet or Web-based environment, while FIG. 12 illustrates a preferred embodiment for a viewer table for hits captured in an SAP R/3 environment.

Figure 13:
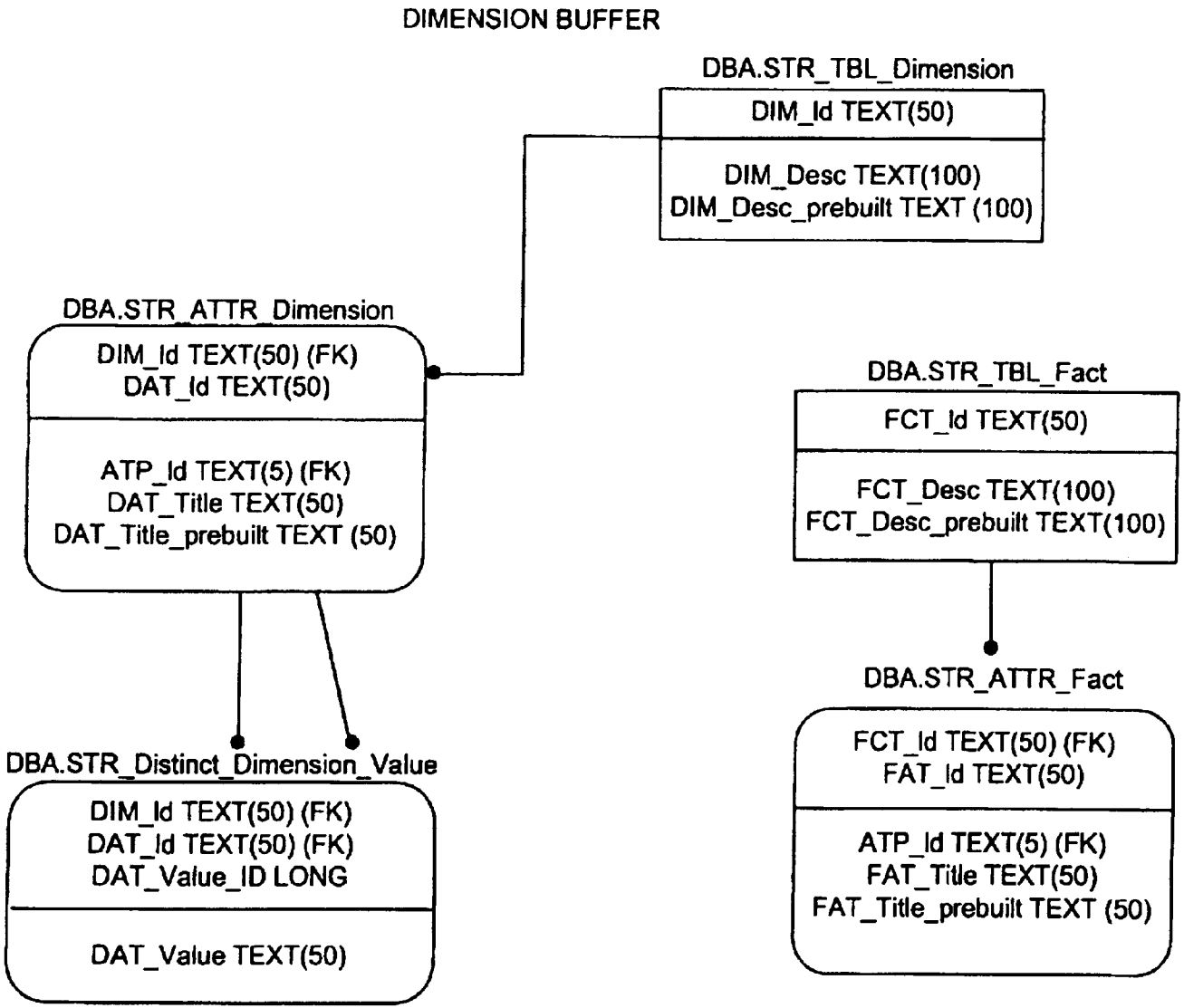
FIG. 13 illustrates a dimension buffer data structure according to one embodiment of the present invention.

FIG. 13 illustrates a dimension buffer data structure according to one embodiment of the present invention. The dimension buffer data structure is useful for speeding OLAP analysis as would be apparent.

In one embodiment of the present invention, import module 640 also stores information from auditor storage 160 into an archive (not shown). The archive is preferably a more permanent storage device. The information stored in the archive may be the raw data as it is stored in auditor storage 160, or it may be data from auditor storage 160 that is stripped of extraneous information not associated with the function or operation of analyzer 220. In either case, the information stored in archive is indexed according to the session identification number associated with each user session 130. Because each session identification is unique and non-reputable, the archive can store user sessions 170 from a variety of sources and a variety of applications without a risk of conflict resulting in the loss of data.

Figure 7:
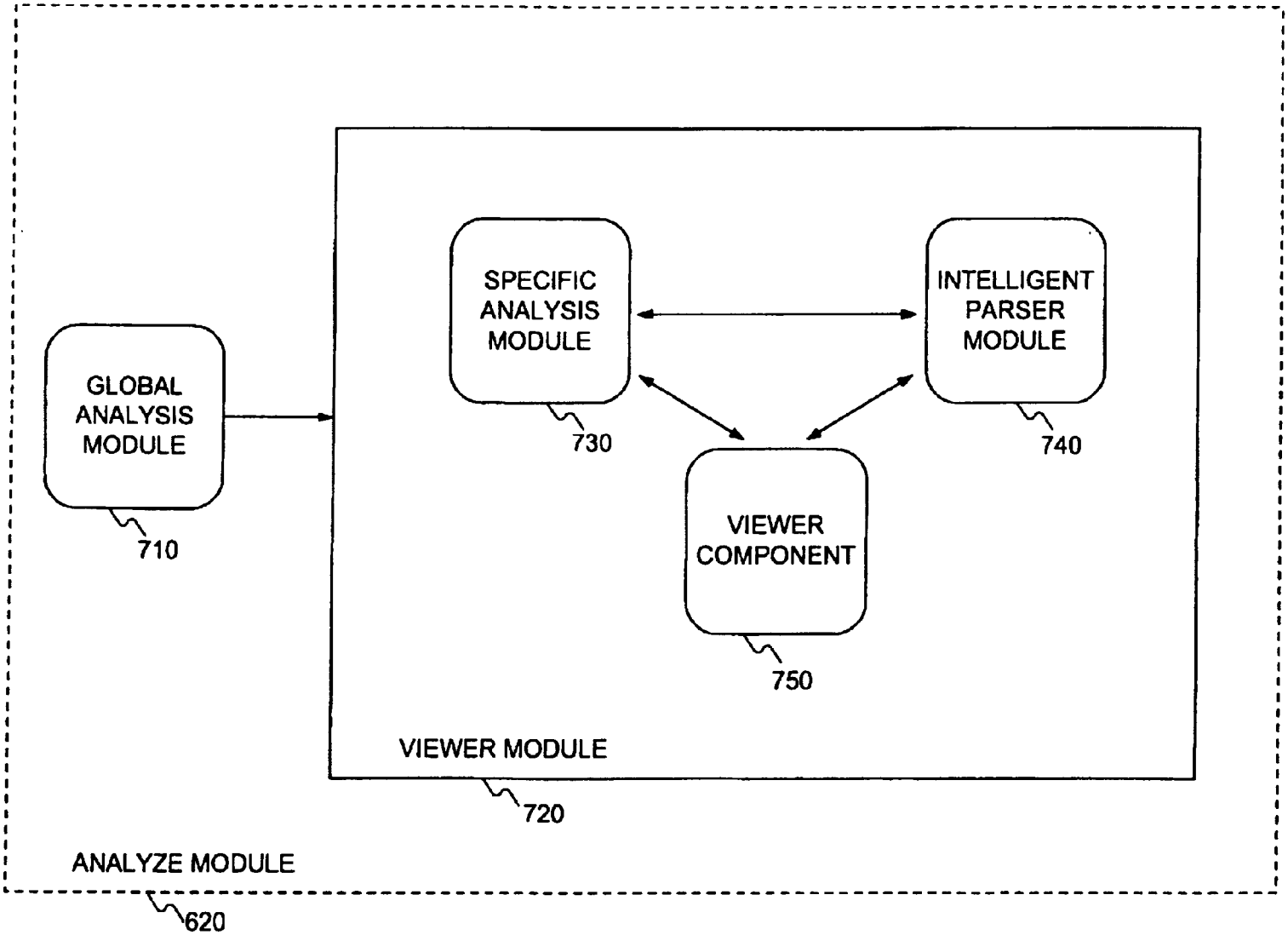
FIG. 7 illustrates an analyze module according to a preferred embodiment of the present invention in further detail.
Figure 8:
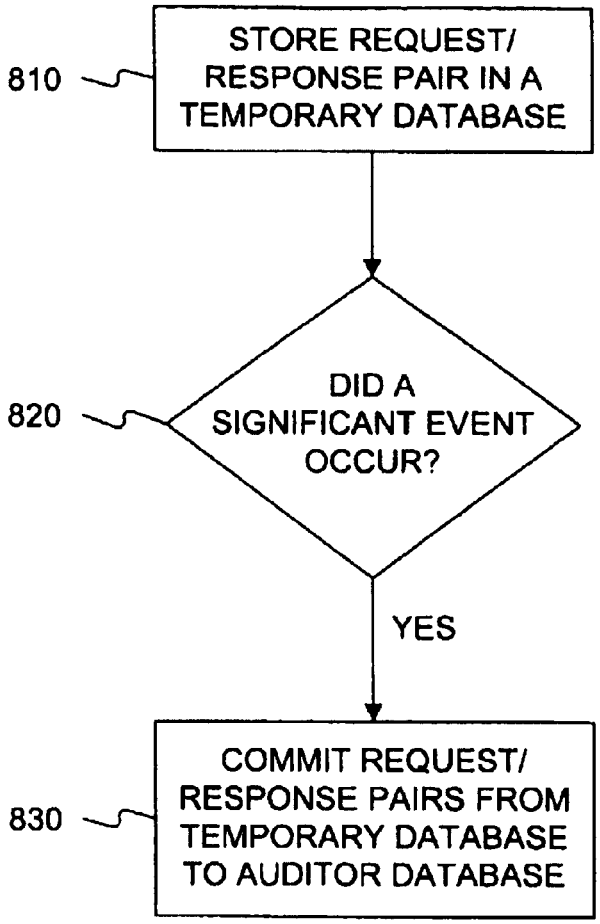
FIG. 8 is a flowchart that illustrates the step of storing data in auditor storage according to one embodiment of the present invention.

Analyze module 620 is now described in further detail with reference to FIG. 7. Analyze module 620 includes a global analysis module 710 and a viewer module 720. Viewer module 720 includes a specific analysis module 730, an intelligent parser 740, and a viewer component 750.

Global analysis module 710 allows analyst 210 to dynamically analyze user sessions 170 stored in analyzer database 720 from various clients 110, server environments 140, and various applications running in client/server environment 100. For example, global analysis module 710 permits analyst 210 to analyze user sessions 170 for all clients 110 that accessed a particular site in server environment 140. In another example, global analysis module 710 permits analyst 210 to analyze user sessions 170 for a particular client 110 that accessed multiple sites in different server environments 140. In yet another example, global analysis module 710 permits analyst 210 to analyze all user sessions 170 that resulted in a purchase of goods on a particular day for all clients 110 and all server environments 140. These are merely examples of how global analysis module 710 might access analyzer database 720 and are limited only by the information available in analyzer database 720 itself.

Viewer module 720 is responsible for visually recreating a particular user session 130, for performing session level analysis, and for presenting it to analyst 210. As mentioned above, viewer module 720 includes specific analysis component 730, intelligent parser module 740, and viewer component 750. Specific analysis component 730 is responsible for constantly providing statistical information associated with a particular dynamically generated screen 120 and the environmental data associated with that screen at the lime it was generated and/or displayed to client 110. In a preferred embodiment of the present invention, specific analysis component 730 also calculates congestion in client/server environment 100 on server environment 140 or on communication link 125 at the time the screen 120 was provided to client 110 by server environment 140.

Viewer component 750 is responsible for physically displaying user session 170. In particular, viewer component 750 provides analyst 210 with means to move through user session 170 as well as to display statistics provided by specific analysis component 720. In a preferred embodiment of the present invention, for each particular client/server application, a separate viewer component 750 exists. For HTML and XML, viewer component 750 is comprised of a web browser. For SAP R/3, viewer component 750 is comprised of a modified version of a front end used by SAP R/3. For other application, viewer component 750 comprises an appropriate .viewing program as would be apparent. In other words, a specific viewer component 750 is used depending on the particular client/server application.

Intelligent parser component 740 scans analyzer database 630 to determine if it includes HTML. If so, intelligent parser component 740 will determine if the HTML has any fields in it to allow intelligent parser component 740 to securely change the value of the fields upon a subsequent user request 134. In this manner, analyst 210 is able to view data entered by client 110 on the dynamically generated screen 120 as it occurred during user session 130. In a preferred embodiment of the present invention, intelligent parser component 740 does not implement this functionality for password fields for security reasons, as would be apparent.

As thus described, the present invention stores all requests 134 and responses 132 that occur between client 110 and server environment 140. However, this approach is not required and furthermore may not be desired, in all client/server environments 100. In alternate embodiments of the present invention, auditor capture filter 150 may only store requests 134 and responses 132 into auditor storage 160 when a significant event occurs. For example, in one embodiment of the present invention, requests 134 and responses 132 are stored in auditor storage 160 only if a purchase was completed. In this example, the purchase is a significant event. In another embodiment of the present invention, significant events may be further broken down. For example, one set of session data is stored for clients 110 that purchase $10 million or more worth of goods, while another set of session data is stored for clients 110 that purchase less than $10 million worth of goods. This embodiment of the present invention eliminates much of the data from auditor storage 160 associated with "surfing" or "browsing" or other insignificant events that might otherwise be stored. However, as would be apparent, in other embodiments of the present invention, such "surfing" or "browsing" data may be useful to determine usage patterns (i.e. shopping patterns) and should be stored in auditor storage 160. The specific significant events that trigger the storage of session data in auditor storage 160 can vary from application to application, as would be apparent.

In the embodiments of the present invention that use such significant events as a criteria for storing session data, requests 134 and responses 132 are preferably stored in a temporary memory until the particular significant event occurs. Once the significant event occurs, requests 134 and responses 132 would be transferred from the temporary memory into auditor storage 160. This process of transferring requests 134 and responses 132 from temporary memory into auditor storage 160 is referred to as "committing" requests 134 and responses 132 to auditor storage 160. Other mechanisms for committing the session data (i.e., requests 134 and responses 132) to auditor storage 160 are available as would be apparent. For example, session data could be stored in auditor 160 prior to the significant event and would be marked or otherwise indicated as being temporary or uncommitted. Once the significant event occurs, this data would be marked as committed. If the significant event does not occur, this data would be subsequently deleted or erased.

With this in mind, the operation of storing step 360 according to this embodiment of the present invention is now described with reference to FIG. 19. In a step 810, auditor capture filter 150 stores a request/response pair in a temporary database or other temporary memory. In a decision step 820, auditor capture filter 150 determines whether a significant event occurred. If the significant event occurred, in a step 830, auditor capture filter 150 commits the request/response pairs stored in the temporary database or temporary memory to auditor storage 160. At some point, if the temporary database or temporary memory was not committed, auditor capture filter 150 would delete such temporary database or temporary memory.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method *executing on a hardware computer system* for visually recreating a user session in a computer environment including a client and a server, the method comprising the steps of:

receiving a request from the client at the server;

capturing at the server the request and first environmental data associated with the computer environment;

determining, by the server, a response to the request;

sending the response from the server to the client;

capturing at the server the response to the request and second environmental data associated with the computer environment; and visually recreating at the server the user session based on the captured request and the captured response.

2. The method of claim 1, wherein the first environmental data is captured at or about when the request is captured.

3. The method of claim 2, wherein the second environmental data is captured at or about when the response is captured.

4. The method of claim 3, further comprising:

retrieving the request;

retrieving the response;

displaying the retrieved request and response on a dynamically generated screen based on the first and second environmental data.

5. The method of claim 4, further comprising:

analyzing the first and second environmental data; and displaying the analyzed environmental data.

6. The method of claim 3, wherein the second environmental data includes information on load, traffic volume, status, and other system data.

7. The method of claim 2, wherein the first environmental data includes information on load, traffic volume, status, and other system data.

8. The method of claim 1, wherein capturing the request comprises receiving session identification information associated with the client.

9. The method of claim 1, wherein visually recreating the user session comprises:

locating the user session;

retrieving the request;

retrieving the response; and displaying the retrieved request and response on a dynamically generated screen.

10. A *hardware* system for visually recreating a user session, *which includes a request and a response to the request,* in a computer environment including a client and a server comprising:

a communication link between the client and the server, a memory, an auditor capture filter capable of capturing the request and a first environmental data associated with the computer environment and storing the request and the first environmental data in the memory;

capturing the response to the request [environment] and storing [the request and the] *a* second environmental data in the memory [environment]; and a display for visually recreating the user session based on the captured request and the captured response.

11. The system of claim 10, wherein the auditor capture filter is further able to capture the first environmental data at or about when the request is captured.

12. The system of claim 11, wherein the auditor capture filter is further able to capture the second environmental data at or about when the response is captured.

13. The system of claim 10, wherein the auditor capture filter is further able to receive session identification information associated with the client.

14. The system of claim 10, further comprising:

a processor for analyzing the first and second environmental data; and wherein the display is further able to display the analyzed environmental data.

*15. The system of claim 10, wherein the auditor capture filter is capable of storing the response to the request.*

*16. The system of claim 15, wherein the first environmental data includes a loading parameter.*

*17. The system of claim 15, wherein the second environmental data includes a loading parameter.*

*18. The system of claim 15, wherein the first environmental data includes a traffic volume parameter.*

*19. The system of claim 15, wherein the second environmental data includes a traffic volume parameter.*

*20. The system of claim 15, wherein the first environmental data includes a status parameter.*

*21. The system of claim 15, wherein the second environmental data includes a status parameter.*

*22. The system of claim 15, wherein the first environmental data includes data available on the communication link.*

*23. The system of claim 15, wherein the second environmental data includes data available on the communication link.*

*24. The system of claim 15, wherein the first environmental data includes data known by the client.*

*25. The system of claim 15, wherein the second environmental data includes data known by the client.*

*26. The system of claim 15, wherein the first environmental data includes data known by the server.*

*27. The system of claim 15, wherein the second environmental data includes data known by the server.*

*28. The system of claim 15, wherein the first environmental data includes data that identifies a date.*

*29. The system of claim 15, wherein the second environmental data includes data that identifies a date.*

*30. The system of claim 15, wherein the first environmental data includes data that is derived from the client.*

*31. The system of claim 15, wherein the second environmental data includes data that is derived from the client.*

*32. The system of claim 15, wherein the first environmental data includes data that is derived from the server.*

*33. The system of claim 15, wherein the second environmental data includes data that is derived from the server.*

*34. The system of claim 15, wherein the first environmental data includes data that identifies a communication protocol.*

*35. The system of claim 15, wherein the second environmental data includes data that identifies a communication protocol.*

*36. The system of claim 15, wherein the first environmental data includes data that indicates if an error occurred.*

*37. The system of claim 15, wherein the second environmental data includes data that indicates if an error occurred.*

*38. The system of claim 15, wherein the first environmental data includes data that indicates if a problem occurred.*

*39. The system of claim 15, wherein the second environmental data includes data that indicates if a problem occurred.*

*40. The system of claim 15, wherein the first environmental data includes data that indicates if a purchase occurred.*

*41. The system of claim 15, wherein the second environmental data includes data that indicates if a purchase occurred.*

*42. The system of claim 15, wherein the first environmental data includes data that indicates if a purchase over a predetermined value occurred.*

*43. The system of claim 15, wherein the second environmental data includes data that indicates if a purchase over a predetermined value occurred.*

*44. The system of claim 15, wherein the first environmental data includes data related to congestion in the computer environment.*

*45. The system of claim 15, wherein the second environmental data includes data related to congestion in the computer environment.*

*46. The system of claim 15, wherein the first environmental data includes data related to congestion in the communication link.*

*47. The system of claim 15, wherein the second environmental data includes data related to congestion in the communication link.*

*48. The system of claim 15, wherein the request includes a markup language statement.*

*49. The system of claim 15, wherein the request includes an HTML tag.*

*50. The system of claim 15, wherein the request includes an XML tag.*

*51. The system of claim 15, wherein the request includes an SGML tag.*

*52. The system of claim 15, wherein the request includes information utilized by an SAP R/3 computer environment.*

*53. The system of claim 15, wherein the auditor capture filter is capable of monitoring the communication link to capture the request and the response.*

*54. The system of claim 15, wherein the auditor capture filter is capable of capturing the request after the server has received the request but before the server has processed the request.*

*55. The system of claim 15, wherein the auditor capture filter is capable of capturing the response to the request after the server has processed the request and determined the response to the request but before the server outputs the response to the request.*

*56. The system of claim 15, wherein the server provides the auditor capture filter with access to the request.*

*57. The system of claim 15, wherein the server provides the auditor capture filter with hooks to session data.*

*58. The system of claim 15, wherein the auditor capture filter is capable of capturing the request with active participation of the server.*

*59. The system of claim 15, wherein the auditor capture filter is capable of capturing the request directly from the communication link.*

*60. The system of claim 15, wherein the server passes the request to the auditor capture filter.*

*61. The system of claim 15, wherein the auditor capture filter captures the request directly from the communication link without cooperation from or participation by the server.*

*62. The system of claim 15, wherein the auditor capture filter is capable of storing the request on a disk drive.*

*63. The system of claim 15, wherein the auditor capture filter is capable of storing the request in RAM.*

*64. The system of claim 15, wherein the auditor capture filter is capable of storing the request in a database.*

*65. The system of claim 15, wherein the auditor capture filter is capable of storing a series of requests and responses that comprise the user session.*

*66. The system of claim 15, wherein the auditor capture filter is capable of storing a series of requests and responses.*

*67. The system of claim 15, wherein the system is capable of storing a plurality of user sessions and the system is capable of locating a user session from the plurality of stored user sessions.*

*68. The system of claim 15, wherein the system is capable of storing a plurality of user sessions and the system is capable of searching for a user session from the plurality of stored user sessions based upon a search parameter.*

*69. The system of claim 15, wherein the system is capable of storing a plurality of user sessions and the system is capable of searching for a user session from the plurality of stored user sessions based upon a date.*

*70. The system of claim 15, wherein the system is capable of storing a plurality of user sessions and the system is capable of searching a user session from the plurality of stored user sessions based upon a session number.*

*71. The system of claim 15, wherein the system is capable of storing a plurality of user sessions and the system is capable of searching for a user session from the plurality of stored user sessions based upon a keyword.*

*72. The system of claim 15, wherein the system is capable of storing a plurality of user sessions and the system is capable of searching for a user session from the plurality of stored user sessions based upon an identifier.*

*73. The system of claim 15, wherein the system is configured to extract data from the response and store the extracted data in a database.*

*74. The system of claim 15, wherein the system is configured to extract data from a plurality of clients and store the data in a database.*

*75. The system of claim 15, wherein the system is capable of storing the request into a data structure that is indexed according to session identification numbers.*

*76. The system of claim 15, wherein the auditor capture filter is capable of committing the request in an auditor storage only if a specified event occurs.*

*77. The system of claim 15, wherein the auditor capture filter is capable of committing the request in an auditor storage only if a purchase occurs.*

*78. The system of claim 15, wherein the auditor capture filter is capable of committing the request in an auditor storage only if a purchase over a predetermined value occurs.*

*79. The system of claim 15, wherein the auditor capture filter is capable of storing the request in the memory regardless of whether a specified event occurs and the auditor capture filter is capable of storing the request in a second memory only if the specified event occurs.*

*80. The system of claim 15, wherein the communication link is a part of the Internet.*

*81. The system of claim 15, wherein the client is identified to the server with a session identification identifier.*

*82. The system of claim 15, wherein the request includes a session identification identifier.*

*83. The system of claim 15, wherein session identification data is implicit, but not express, in the request.*

*84. The system of claim 15, wherein the system is configured to allow an analyst to determine how the client moves through a network application.*

*85. The system of claim 15, wherein the system is configured to display how the client moves through a network application.*

*86. The system of claim 15, wherein the system is configured to allow an analyst to determine how the client moves through an e-commerce Internet application.*

*87. The system of claim 15, wherein the system is configured to display how the client moves through an e-commerce Internet application.*

*88. The system of claim 15, wherein the system is configured to allow an analyst to determine how the client moves through an e-commerce network application.*

*89. The system of claim 15, wherein the system is configured to display how the client moves through an e-commerce network application.*

*90. The system of claim 15, wherein the system is configured to allow an analyst to determine how the client moves through a network application in order to make a purchase.*

*91. The system of claim 15, wherein the system is configured to display how the client moves through a network application in order to make a purchase.*

*92. The system of claim 15, wherein the system is configured to allow an analyst to isolate an error.*

*93. The system of claim 15, wherein the system is configured to allow an analyst to recreate the user session in an effort to identify a problem with a network application.*

*94. The system of claim 15, wherein the system is configured to allow an analyst to step through a plurality of requests and responses in the time sequence that the requests and responses occurred.*

*95. The system of claim 15, wherein the system is configured to generate a plurality of screens that were displayed during the user session.*

*96. The system of claim 15, wherein the system is configured to allow an analyst to evaluate any request made by the client and to evaluate any response to any request.*

*97. The system of claim 15, wherein the system is configured to allow an analyst to evaluate the request after the user session is complete.*

*98. The system of claim 15, wherein the system is configured to allow an analyst to evaluate the request while the user session is occurring.*

*99. The system of claim 15, wherein the system includes an analyzer that retrieves a plurality of requests from an auditor storage.*

*100. The system of claim 15, wherein the system includes an analyzer that retrieves a plurality of requests from the auditor capture filter.*

*101. The system of claim 15, wherein the system is configured to perform an analysis based at least in part upon either the first environmental data or the second environmental data.*

*102. The system of claim 15, wherein the system is capable of visually recreating a user session based at least in part upon data entered by a user.*

*103. The system of claim 15, wherein the system is configured to compare data obtained from different clients.*

*104. The system of claim 15, wherein the system is configured to compare data obtained from different servers.*

*105. The system of claim 15, wherein the system is configured to compare data obtained from different network applications.*

*106. The system of claim 15, wherein the system is configured to perform a session-specific analysis.*

*107. The system of claim 15, wherein the system is capable of allowing an analyst to dynamically analyze a plurality of user sessions from a plurality of clients.*

*108. The system of claim 15, wherein the system is capable of displaying a plurality of user sessions from a plurality of clients.*

*109. The system of claim 15, wherein the system is capable of allowing an analyst to dynamically analyze a plurality of user sessions from a plurality of servers.*

*110. The system of claim 15, wherein the system is capable of displaying a plurality of user sessions from a plurality of servers.*

*111. The system of claim 15, wherein the system is capable of allowing an analyst to dynamically analyze user sessions from all clients that accessed a particular Web site.*

*112. The system of claim 15, wherein the system is capable of allowing an analyst to dynamically analyze user sessions from all clients that accessed a particular Web site during a specific time period.*

*113. The system of claim 15, wherein the system is capable of displaying user sessions from all clients that accessed a particular Web site during a specific time period.*

*114. The system of claim 15, wherein the system is capable of allowing an analyst to analyze user sessions for a client that accessed multiple Web sites hosted on different servers.*

*115. The system of claim 15, wherein the system is capable of displaying user sessions for a client that accessed multiple Web sites hosted on different servers.*

*116. The system of claim 15, wherein the system is capable of allowing an analyst to analyze all user sessions that resulted in a purchase of goods.*

*117. The system of claim 15, wherein the system is capable of displaying all user sessions that resulted in a purchase of goods.*

*118. The system of claim 15, wherein the system is capable of allowing an analyst to analyze all user sessions that resulted in a purchase of goods during a specific time interval.*

*119. The system of claim 15, wherein the system is capable of displaying all user sessions that resulted in a purchase of goods during a specific time interval.*

*120. The system of claim 15, wherein the system includes a database that contains data that indicates whether a user session resulted in a purchase of goods.*

*121. The system of claim 15, wherein the system is capable of calculating congestion in the computer environment.*

*122. The system of claim 15, wherein the system is capable of calculating congestion in the communication link.*

*123. The system of claim 15, wherein the system is capable of displaying congestion in the computer environment.*

*124. The system of claim 15, wherein the system is capable of displaying congestion in the communication link.*

*125. The system of claim 15, wherein the system is capable of scanning a database to determine if the database includes a field that could be changed by a request from the client.*

*126. The system of claim 15, wherein the system is capable of displaying data entered by a user of the client.*

*127. The system of claim 15, wherein the system is capable of displaying data entered by a user of the client in the same sequence that the data was entered by the user during a user session.*

*128. The system of claim 15, wherein the system is capable of displaying some but not all data entered by a user of the client.*

*129. The system of claim 15, wherein the system is capable of displaying all data entered by a user of the client except user-entered passwords.*

*130. The system of claim 15, wherein the auditor capture filter is capable of monitoring the communication link to capture the request and the response, the auditor capture filter is capable of storing the response to the request on a disk drive only if a specified event occurs, the first environmental variable is a loading parameter, and the request includes an HTML tag.*

* * * * *